# (12) United States Patent
Schmatloch et al.

(10) Patent No.: US 10,040,895 B2
(45) Date of Patent: Aug. 7, 2018

(54) ACTIVATOR COMPOSITION, ADHESIVE SYSTEM COMPRISING THE SAME, AND METHOD OF BONDING SUBSTRATES USING THE SAME

(71) Applicant: Dow Global Technologies LLC, Midland, MI (US)

(72) Inventors: Stefan Schmatloch, Thalwil (CH); Gunter G. Santoro, Chur (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/910,077

(22) PCT Filed: Sep. 11, 2014

(86) PCT No.: PCT/US2014/055140
§ 371 (c)(1),
(2) Date: Feb. 4, 2016

(87) PCT Pub. No.: WO2015/041921
PCT Pub. Date: Mar. 26, 2015

(65) Prior Publication Data
US 2016/0194435 A1    Jul. 7, 2016

Related U.S. Application Data

(60) Provisional application No. 61/879,686, filed on Sep. 19, 2013.

(51) Int. Cl.
| | |
|---|---|
| *C08G 18/77* | (2006.01) |
| *C09J 5/02* | (2006.01) |
| *C09J 175/04* | (2006.01) |
| *C08L 75/04* | (2006.01) |
| *C08G 18/32* | (2006.01) |
| *C08G 18/76* | (2006.01) |
| *C08G 18/50* | (2006.01) |
| *C08G 18/80* | (2006.01) |

(52) U.S. Cl.
CPC ........ *C08G 18/776* (2013.01); *C08G 18/3215* (2013.01); *C08G 18/5045* (2013.01); *C08G 18/7657* (2013.01); *C08G 18/775* (2013.01); *C08G 18/8019* (2013.01); *C09J 5/02* (2013.01); *C09J 175/04* (2013.01); *C09J 2475/00* (2013.01)

(58) Field of Classification Search
CPC ........ C09J 175/04; C09J 5/02; C09J 2475/00; C08L 75/04; C08G 18/776; C08G 18/5045; C08G 18/7657; C08G 18/775; C08G 18/8019; C08G 18/3215
See application file for complete search history.

(56) References Cited

U.S. PATENT DOCUMENTS

| | | | |
|---|---|---|---|
| 3,226,276 A | 12/1965 | Rye et al. | |
| 3,268,467 A | 8/1966 | Rye et al. | |
| 3,325,333 A | 6/1967 | Kigane et al. | |
| 3,661,623 A | 5/1972 | Bhakuni et al. | |
| 3,663,354 A | 5/1972 | Ueno et al. | |
| 3,726,752 A * | 4/1973 | Provost | C09J 7/0257 156/307.5 |
| 4,031,288 A | 6/1977 | Bhakuni et al. | |
| 4,134,726 A | 1/1979 | Rye et al. | |
| 7,662,482 B2 | 2/2010 | Wang et al. | |
| 8,080,609 B2 | 12/2011 | Schmatloch | |
| 2010/0105829 A1* | 4/2010 | Schmatloch | C08G 18/4829 524/588 |

FOREIGN PATENT DOCUMENTS

CA    690505 A    7/1964

OTHER PUBLICATIONS

"Isocyanates" Dow Polyurethanes Case Market Applications The Dow Chemical Company product brochure, downloaded Jul. 3, 2017.
Zhang et al., J. Mater. Chem. A, 2015, 3, 15413.

* cited by examiner

*Primary Examiner* — Rabon Sergent

(57) ABSTRACT

A novel activator composition having good storage stability and capable of providing a long open time and good adhesion performance in combination with an adhesive, an adhesive system comprising the composition, and a method of bonding substrates together using the activator composition or the adhesive system.

16 Claims, No Drawings

ACTIVATOR COMPOSITION, ADHESIVE SYSTEM COMPRISING THE SAME, AND METHOD OF BONDING SUBSTRATES USING THE SAME

FIELD OF THE INVENTION

The present invention relates to an activator composition, an adhesive system comprising such activator composition, and a method of bonding substrates using the activator composition or the adhesive system.

INTRODUCTION

Isocyanate functional adhesives (often referred to as polyurethane adhesives) are widely used for bonding a variety of substrates. Isocyanate functional adhesives can be formulated to provide a wide variety of properties depending on the substrates and the use of the resultant manufactured articles. For structural or semi-structural applications, fast curing two-component isocyanate functional adhesives are generally used. One-component isocyanate functional adhesives are usually used in applications with lower demand for stiffness and hardness such as in roof modules and interior add-on parts.

Plastic parts are widely used on automobiles as interior parts and bumper fascia. Thermoplastics such as blends of polybutyleneterephthalate and polyethyleneterephthalate, polyamide, and blends of polybutyleneterephthalate and acrylonitrile styrene acrylate are widely used in automotive manufacturing in combination with moisture curing one-component isocyanate functional adhesives. However, adhesion performance of conventional isocyanate functional adhesives to these plastic substrates is generally less than satisfactory, particularly when two-component polyurethane adhesives are used.

Plastic surfaces typically require surface treatments to facilitate bonding with isocyanate functional adhesives. Such treatments include flame treatment, corona discharge treatment, chemical etching, and/or activator application. Typical adhesive systems are utilized in processes wherein an activator is applied to a substrate, the solvent in the activator is allowed to volatilize away, and then an adhesive is applied to the surface of the treated substrate. However, many manufacturers including automobile manufacturers are trying to reduce or eliminate process steps within their facilities. Thus outsourcing surface treatments to plastic substrates is more desirable, which requires activators having an open time sufficiently long to allow application of activators to substrates at a time and location remote from the assembly operations where adhesives are applied. In the automobile manufacturing industry, this means that component parts are primed in the plant of the component supplier and then shipped to the automobile assembly plant.

Therefore, it is desirable to provide an activator composition that is capable of linking an adhesive, in particular, a two-component isocyanate functional adhesive, to plastic substrates. It is further desirable that such composition provides a long open time. It is also desirable that such activator composition is stable during storage.

SUMMARY OF THE INVENTION

The present invention provides a novel activator composition that offers a solution to the problems described above. The composition of the present invention comprises a phenolic compound containing at least two hydroxyl groups in meta position, an aromatic polyisocyanate compound having more than two isocyanate groups, and a solvent, and has a specific solids content and molar ratio of hydroxyl groups to isocyanate groups. Surprisingly, such composition is capable of linking isocyanate functional adhesives to plastic substrates with surprising good results. In some embodiments, the composition of the present invention is also able to provide an open time as long as 45 days or longer. Thus, the application of the composition of the present invention and the application of an adhesive is able to be conducted at different locations. The composition of the present invention has good storage stability. For example, after aging at 40° C. for 6 weeks, or even 4 months, the isocyanate content of the composition changes less than 10%. The resultant aged composition is able to provide a failure mode of at least 75% cohesive failure according to the test method described in the Examples section below.

"Open time" herein refers to the time from application of the composition of the present invention until the application of an adhesive wherein the composition is capable of linking up to the adhesive. The open time starts when the solvent of the composition of the present invention has volatilized away after application to the substrate and ends when the part of the composition remaining on the surface of the substrate is no longer able to link up to the adhesive. Evidence of the failure to link the adhesive to the composition is adhesive failure from the surface of the primed surface according to the test method described in the Examples section below. "Link up" herein refers to the ability of the composition of the present invention to chemically react with the adhesive to form chemical bonds. Evidence of link up is demonstrated by cohesive failure according to the test method described in the Examples section below.

In a first aspect, the present invention is a composition comprising:
(a) a phenolic compound containing at least two hydroxyl groups in meta position,
(b) an aromatic polyisocyanate compound having more than two isocyanate groups, and (c) a solvent,
wherein the molar ratio of total hydroxyl groups to total isocyanate groups of the composition is from 1.6 to 3.0, and the composition has a solids content from 7 to 50 weight percent (wt %) based on the total weight of the composition.

In a second aspect, the present invention is an adhesive system comprising the composition of the first aspect, and an adhesive.

In a third aspect, the present invention is a method of bonding a first substrate to a second substrate, comprising:
(i) applying the composition of the first aspect to the surface of at least one of the substrates and allowing the solvent to evaporate,
(ii) applying an adhesive to the surface of at least one of the substrates treated by the composition in step (i),
(iii) contacting the two substrates with the adhesive residing therebetween, and
(iv) curing the adhesive.

DETAILED DESCRIPTION OF THE INVENTION

The composition of the present invention comprises (a) one or more phenolic compounds containing at least two hydroxyl groups in meta position. Preferably, the phenolic compound contains two hydroxyl groups. Preferred phenolic compounds include resorcinol ("1,3-dihydroxybenzene"), resole, an alkoxylated resole, or mixtures thereof. "Resole"

herein refers to the condensation product of 1,3-dihydroxybenzene with formaldehyde. In a preferred embodiment, resorcinol is used.

The concentration of the phenolic compound in the composition of the present invention, as component (a), may be, based on the total weight of the composition, 2 wt % or more, 4 wt % or more, or even 6 wt % or more, and at the same time, 20 wt % or less, 14 wt % or less, or even 11 wt % or less.

The composition of the present invention further comprises (b) one or more aromatic polyisocyanate compounds having more than two isocyanate groups. "Aromatic polyisocyanate compounds" herein refers to a compound having at least one isocyanate group bonded to aromatic carbon atoms. The aromatic polyisocyanate compounds may include one or more adducts of aromatic polyisocyanates with compounds having one or more isocyanate reactive groups. The average isocyanate functionality of the aromatic polyisocyanate compounds may be 2.1 or more, 2.3 or more, or even 2.4 or more, and at the same time, 4.0 or less, 3.5 or less, or even 3.0 or less. Preferably, the aromatic polyisocyanate compound has at least three isocyanate functional groups. The aromatic polyisocyanate compound may comprise a phosphorous containing aromatic polyisocyanate. More preferably, the isocyanate is a thiophosphate with at least three isocyanate groups. Examples of suitable aromatic polyisocyanate compounds include tris(isocyanatophenyl)thiophosphate, tris(p-isocyanatophenyl)methane, toluene-2,4,6-triisocyanate, 4,4'-dimethyldiphenylmethane-2,2',5'5'-tetraisocyanate, and polymeric derivates thereof, and mixture thereof. Suitable commercially available aromatic polyisocyanate compounds may include, for example, DESMODUR™ RFE polyisocyanate, a solution of tris(p-isocyanatophenyl)thiophosphate in ethyl acetate, available from Bayer Material Science.

The aromatic polyisocyanate compounds in the composition of the present invention, as component (b), may comprise one or more silane functionalized aromatic polyisocyanate compounds. The silane functionalized aromatic polyisocyanate compounds herein refer to the reaction product of the aromatic polyisocyanate compound described above with an organofunctional silane containing an isocyanate reactive group. "Isocyanate reactive group" herein includes any active hydrogen containing moiety such as —COOH, —OH, —NH$_2$, —NH—, —CONH$_2$, —SH, and —CONH— groups. Preferably, the organofunctional silane comprises an aminosilane. Preferred aminosilane is a secondary amino silane. Particularly suitable aminosilane contains at least two silyl groups, a methoxy silane ester, a hindered secondary amino group or any combination thereof. More preferably, the aminosilane is bis-(trimethoxysilylpropyl)-amine such as SILQUEST™ A-1170 available from Momentive Performance Materials Inc. The organofunctional silanes used to prepare the adduct may comprise silanes having a hydroxy functionality and/or a mercapto functionality such as 3-aminopropyltrimethoxysilane; 3-aminopropyltriethoxysilane; 3-aminopropyltrismethoxyethoxyethoxysilane; 3-aminopropyl-methyl-diethoxysilane; N-methyl-3-aminopropyltrimethoxysilane; N-butyl-3-aminopropyltrimethoxysilane; 3-mercaptopropyltrimethoxysilane; 3-mercaptopropyltriethoxysilane; 3-mercaptopropyl-methyldimethoxysilane; (N-gyclohexylaminomethy)methyldi-ethoxysilane; (N-cyclohexylaminomethyl)triethoxysilane; (N-phenylaminomethyl)methyldimethoxysilane; (N-phenylaminomethyl)trimethoxysilane; N-ethyl-aminoisobutyltrimethoxysilane; 4-amino-3,3-dimethylbutyltrimethoxysilane; or combinations thereof. Preferably, the silane functionalized aromatic polyisocyanate compound is silane functionalized tris(p-isocyanatophenyl)thiophosphate), which is the reaction product of tris(p-isocyanatophenyl)thiophosphate) with a silane selected from an aminosilane, a mercapto silane, or combination thereof, wherein the silane includes two or more alkoxy groups bound to silicon. The silane functionalized aromatic polyisocyanate compounds may be prepared by reacting about 1 mole the aromatic polyisocyanate compound with about 1 to 3 moles the organofunctional silane, and preferably about 2 moles the organofunctional silane.

The aromatic polyisocyanate compounds in the composition of the present invention, as component (b), may comprise polymeric methylene diphenyl diisocyanate ("polymeric MDI"). Polymeric MDI herein refers to a mixture of diphenylmethane diisocyanate and polyphenylene polymethylene polyisocyanates. The polyphenylene polymethylene polyisocyanates tend to be mainly three-ring and four-ring structures, although some higher molecular weight materials may be present. Polymeric MDI may contain from 2.5 to 3.5 isocyanate groups per molecule and have an isocyanate equivalent weight of from about 130 to 150, or from about 132 to 140. Suitable commercially available polymeric MDI products may include, for example, DESMODUR VL R20 MDI-based polyisocyanate available from Bayer Material Science, and PAPI™ 27 and PAPI 32 polymeric MDI both available from The Dow Chemical Company (PAPI is a trademark of The Dow Chemical Company).

Preferably, the aromatic polyisocyanate compound in the composition of the present invention, as component (b), comprises tris(p-isocyanatophenyl)thiophosphate, silane functionalized tris(p-isocyanatophenyl)thiophosphate, tris(p-isocyanatophenyl)methane; polymeric MDI; or mixtures thereof. More preferably, the aromatic polyisocyanate compound comprises tris(p-isocyanatophenyl)methane.

The concentration of the aromatic polyisocyanate compound, as component (b), may be, based on the total weight of the composition, 4 wt % or more, 5 wt % or more, or even 8 wt % or more, and at the same time, 26 wt % or less, 22 wt % or less, or even 20 wt % or less.

The isocyanate content of the composition of the present invention may be 1.0 wt % or higher, 1.2 wt % or higher, or even 1.5 wt % or higher, and at the same time, 7.0 wt % or less, 6.0 wt % or less, or even 5.5 wt % or less, based on the total weight of the composition.

The molar ratio of total hydroxyl (OH) groups to total isocyanate (NCO) groups of the composition of the present invention (hereinafter referred to as "OH/NCO molar ratio") is important for the adhesion performance of the composition. The OH/NCO molar ratio of the composition may be 1.6 or higher, 1.7 or higher, or even 1.75 or higher, and at the same time, 3.0 or less, 2.8 or less, or even 2.5 or less.

The composition of the present invention further comprises (c) one or more solvents. Any solvent which dissolves or disperses all components of the composition may be used. Preferably, the solvent volatilizes away under ambient conditions. Preferably, the solvent has a boiling point of between 50 and 180° C. Examples of suitable solvents include ketones such as methyl ethyl ketone, esters, ethers, hydrocarbons such as aliphatic hydrocarbons and toluene, or mixtures thereof. Preferred solvents include 3-methoxy-n-butylacetate, ethyl acetate, or mixtures thereof. In some embodiments, ethyl acetate is used.

The solvent in the composition of the present invention, as component (c), may be present in a sufficient amount to dissolve or disperse all components of the composition. For example, the concentration of the solvent may be, based on the total weight of the composition, 50 wt % or more, 60 wt % or more, or even 65 wt % or more, and at the same time, 93 wt % or less, 90 wt % or less, or even 85 wt % or less.

The composition of the present invention may further comprise (d) one or more fluorescing agents, which fluoresce when illuminated by ultraviolet (UV) light. Suitable commercially available fluorescing agents include, for example, UVITEX™ OB fluorescing agent available from Ciba Specialty Chemicals. The fluorescing agents may be present in a sufficient amount so that the area of substrate treated with the composition is apparent when the window is illuminated with an ultraviolet light. When used, the concentration of the fluorescing agent may be, based on the total weight of the composition, from 0.001 to 1.5 wt %, from 0.005 to 0.5 wt %, or from 0.01 to 0.2 wt %.

The composition of the present invention may further comprise (e) one or more surfactants, also called wetting agents. Surfactants include natural or synthetic substances which can further improve substrate wetting of the composition when deposited on the surface of a substrate Surfactants may include anionic, cationic, nonionic, and ampholytic surfactants or mixtures thereof. Examples of suitable anionic surfactants include surfactants containing carboxylate, sulfate, phosphate or sulfonate groups, for example, amino acid derivatives, fatty alcohol ether sulfates, fatty alcohol sulfates, soaps, alkylphenol ethoxylates, fatty alcohol ethoxylates, alkanesulfonates, olefinsulfonates and alkyl phosphates. Examples of suitable nonionic surfactants include ethoxylates such as ethoxylated adducts of alcohols such as polyoxyalkylene polyols, amines, fatty acids, fatty acid amides, alkylphenols, ethanol amides; fatty amines, polysiloxanes or fatty acid esters, alkyl or alkylphenyl polyglycol ethers such as fatty alcohol polyglycol ethers, fatty acid amides, alkylglycosides, sugar esters, sorbitan esters, polysorbates or trialkylamine oxides, esters and amides of poly(meth)acrylic acids; with polyalkylene glycols or aminopolyalkylene glycols, which may be capped at not more than one end with alkyl groups. Examples of suitable cationic surfactants include quaternary ammonium or phosphonium compounds, for example, tetraalkylammonium salts, N,N-dialkyl-imidazoline compounds, dimethyldistearylammonium compounds, N-alkyl-pyridine compounds, ammonium chlorides, or mixtures thereof. Examples of suitable ampholytic or amphoteric surfactants include amphoteric electrolytes, also known as ampholytes, such as aminocarboxylic acids and betaines.

Preferably, the surfactants useful in the present invention comprise alkoxylated alcohols, fatty acids, fatty acid esters or mixtures thereof. More preferably, the surfactants are alkoxylated alcohols. The alkoxylated alcohols comprise one or more alcohols having a chain of alkylene oxide groups bonded thereto. Preferred alkylene oxide groups are ethylene oxide, propylene oxide, and butylene oxide. Suitable commercially available surfactants may include, for example, ZONYL™ FSO-100 alkoxylated nonionic fluorosurfactant available from ABCR, ANTAROX™ FM 33 alkoxylated alcohol surfactant available from Rhodia, HYDROPALAT™ 120 alkoxylated fatty alcohol surfactant available from Cognis, TEGO™ Surten W111 nonionic alcohol ethoxylated surfactant available from Evonik Industries, or mixtures thereof.

When used, the concentration of the surfactant in the composition may be, based on the total weight of the composition, from 0.001 to 2 wt %, from 0.01 to 0.5 wt %, or from 0.05 to 0.5 wt %.

The composition of the present invention may further comprise one or more additional phenolic compounds ("second phenolic compounds"). The additional phenolic compounds may be any phenolic compounds that are different from the phenolic compounds used as component (a) described above. Examples of suitable additional phenolic compounds include hydrochinon ("1,4-dihydroxybenzene"), catechol ("1,2-dihydroxybenzene"), bisphenols such as bisphenol A or its derivatives such as o,o'-dially-bisphenol A, bisphenol M or its derivatives, or mixtures thereof. The additional phenolic compounds may be used in an amount without compromising the storage stability, adhesion performance and open time of the composition. For example, the additional phenolic compound may be present in an amount of from 0.1 to 4.0 wt %, or from 0.5 to 2.0 wt %, based on the total weight of the composition.

The composition of the present invention may further comprise one or more additional polyisocyanate compounds ("second polyisocyanate compounds"). The additional polyisocyanate compounds may be any polyisocyanate compounds that are different from the aromatic polyisocyanate compound used as component (b) described above. Examples of suitable additional polyisocyanate compounds include aliphatic or aromatic prepolymers derived from the reaction of at least one aliphatic or aromatic polyisocyanate and a polyol, prepolymers derived from the reaction of at least one aromatic polyisocyanate and an aromatic compound with at least two active hydrogens, or mixtures thereof. The additional polyisocyanate compound may be used in an amount without compromising the storage stability, adhesion performance and open time of the composition. For example, the additional polyisocyanate compound may be present in an amount of from 0.1 to 4.0 wt %, or from 0.5 to 2.0 wt %, based on the total weight of the composition.

The composition of the present invention may further comprise one or more film forming resins. The film forming resins may be present for the purpose of forming a film which further enhances substrate wetting and film formation of the composition when deposited on the surface of a substrate. The film forming resin is preferably a high molecular weight resin. Any high molecular weight resin which forms a film upon evaporation of the solvent may be used. The high molecular weight resin can have functional groups which react into adhesives or react with the surface of a substrate. Examples of suitable film forming resin are resins containing one or more functional groups selected from vinyl, acrylate, styrenic, diene, methacrylate, allyl, thiolene, vinyl ether, unsaturated ester, imide, N-vinyl, acrylamide containing groups and mixtures thereof. Preferred functional groups are acrylates. The concentration of the film forming resin may be, based on the total weight of the composition, from 0 to 20 wt %, from 1 to 10 wt %, or from 2 to 8 wt %.

The composition of the present invention may further comprise one or more light stabilizers, heat stabilizers, or mixtures thereof. Preferably, the composition comprises a stabilizing amount of an organophosphite. The organophosphite may be present in a sufficient amount to enhance the durability of bonding of an adhesive to the surface of a substrate. Preferred organophosphites are phosphites. Ligands on the phosphites may comprise one ligand with at least one aliphatic moiety and one ligand with at least one aromatic moiety, or comprise at least one ligand having both aromatic and aliphatic structure. Ligands herein refer to the groups bound to the oxygens that are bound to the phosphorous atoms of the phosphites. Suitable commercially available organophosphites include, for example, DOVERPHOS™ 12 poly(dipropyleneglycol)phenyl phosphite, DOVERPHOS 675 tetrakis isodecyl 4,4'-isopropylidene diphosphite, and DOVERPHOS 7 phenyl diisodecyl phosphite all available from Dover Chemical Corporation; or mixtures thereof. When used, the organophosphite may be present in the composition in an amount of from 0.01 to 1.0 wt %, or from 0.1 to 0.4 wt %, based on the total weight of the composition.

In addition to the components described above, the composition of the present invention may further comprise one or more of the following additives: coalescents, cosolvents, buffers, neutralizers, non-thickening rheology modifiers, dispersants, humectants, mildewcides, biocides, anti-skinning agents, colorants, flowing agents, crosslinkers, antioxidants, plasticizers, leveling agents, dispersants, thixotropic agents, amine or organometallic polyurethane catalysts, diluents, and drying agents such as molecular sieve pastes and allylsilanes. These additives may be present in an amount of from 0 to 10 wt %, 0.001 to 5 wt %, or from 0.01 to 2 wt %, based on the total weight of the composition.

In some embodiments, the composition of the present invention comprises, based on the total weight of the composition, (a) from 6 to 13 wt % of the phenolic compound, (b) from 4.6 to 20.3 wt % of the aromatic polyisocyanate compound, (c) from 65 to 85 wt % of the solvent, (d) from 0.05 to 0.3 wt % of the fluorescing agent, and (e) from 0 to 1 wt % of the surfactant.

The composition of the present invention can be prepared by admixing (a) the phenolic compound, (b) the aromatic polyisocyanate compound, and (c) the solvent described above. Other optional components may also be added as described above. Components in the composition may be mixed in any order to provide the composition of the present invention. Any of the above-mentioned optional components may also be added to the composition during or prior to the mixing to form the composition.

The solids content of the composition of the present invention is directly related to the adhesion performance of the composition. The solids content of the composition may be, based on the total weight of the composition, 7 wt % or more, 10 wt % or more, 16 wt % or more, 18 wt % or more, or even 20 wt % or more, and at the same time, 50 wt % or less, 40 wt % or less, 36 wt % or less, or even 35 wt % or less. "Solids content" herein refers to the weight percentage of total components that do not evaporate under ambient climatic conditions, based on the total weight of the composition.

The composition of the present invention has good storage stability, for example, the composition after aging at 40° C. for 6 weeks, or even 4 months, the NCO content of the composition decreases less than 10%. The resultant aged composition is able to provide a failure mode of at least 75% cohesive failure according to the test method described in the Examples section below. The composition of the present invention is able to provide an open time of 1 minute or greater, 10 minutes or greater, 15 minutes or greater, 1 days or greater, or even 7 days or greater, and at the same time, 12 months or less, 9 months or less, or even 6 months or less.

The composition of the present invention can be used as activators for a variety of substrates such as plastics, sheet molding compounds (SMC), metals such as various steel alloys, aluminum, magnesium, titanium, copper and bronze; ceramic materials; various composites; coated metals; glass; and wood. The composition of the present invention can be used to assemble substrates of the same material and substrates of any mixture of the described materials. Plastics herein may include thermoplastics, thermosets, rubber, elastomers, and combinations thereof. Reinforced, un-reinforced, filled, orunfilled plastics may also be used. A preferred application is when the substrate is a fiber-reinforced plastic, SMC, resin transfer molding (RTM), bulk molding compound (BMC). The fibers may be glass or other ceramic, metal, carbon, plant fibers such as jute and hemp, or mixture thereof. Examples of suitable plastics include polyolefins such as polyethylene, polypropylene, and olefin containing block co-polymers; polyamides; fluorinated polymers such as polytetrafluoroethylene (TEFLON); polyesters such as polybutylene terephthalate ("PBT"), polyethylene terephthalate ("PET"), or blends of PBT and PET ("PBT/PET"); epoxy or polyester based fiber reinforced plastics; epoxy or polyester based sheet molding compounds; uncoated polycarbonates, polyacrylate and polymethacrylate polymers and copolymers such as acrylate styrene acrylonitrile copolymer (ASA) and butyl acrylate styrene acrylonitrile copolymers; syndiotactic polystyrene; styrene acrylonitrile copolymers, acrylonitrile-butadiene-styrene (ABS) copolymers; or mixtures thereof. In a preferred application, the substrate material is fiber reinforced or un-reinforced plastics selected from uncoated polycarbonate, epoxy, polyamide, PBT, PET, PBT/PET, and blends of PBT and ASA. In some embodiments, glass fiber-reinforced PBT/PET is used.

The composition of the present invention may be applied by any means known in the art. It may be applied manually by brushing, rolling, spaying, or applying an absorbent material, such as a cloth, containing the composition to the surface of a substrate to which the adhesive will be applied. The composition can be applied by hand using an absorbent material such as a felt or sponge applicator, a primer stick or by robotic application, utilizing machines such as automated felt applicator as provided by Nordson Deutschland GmbH, Erkrath, Germany, automated spray application equipment as provided by SCA Schucker GmbH, Bretten-Golshausen, Germany or the M710I robotic system available from Fanuc Robotics America of Rochester Hills, Mich. used with an automated primer dispense applicator supplied by Nordson Corporation, Amherst, Ohio. In one embodiment, the composition of the present invention is applied to a substrate and the solvent is allowed to evaporate away from the surface of the substrate. In another embodiment, an absorbent material is wiped over the substrate to which the composition was applied. Preferably, the composition is applied and the solvent is allowed to evaporate off.

The adhesive system of the present invention comprises the composition described above, and an adhesive. The adhesive may contain one or more functional groups selected from acrylic, methacrylic, isocyanate, siloxy, or mixtures thereof. Preferably, an isocyanate functional adhesive is used.

The isocyanate functional adhesives useful in the present invention comprise an isocyanate functional component. The isocyanate functional component contains one or more compounds having on average more than one isocyanate functional group per molecule. The isocyanate functional component can be in the form of an isocyanate functional prepolymer or in the form of a monomer or oligomer having on average greater than 1 isocyanate group, and preferably 2 or more isocyanate groups.

The isocyanate functional adhesives useful in the present invention can be one-component or two-component adhesives. The one-component adhesives typically cure by moisture curing. Suitable commercially available one-component isocyanate functional adhesives include, for example, BETASEAL™ 8001 adhesive available from The Dow Chemical Company (BETASEAL is a trademark of The Dow Chemical Company).

In some embodiments, the isocyanate functional adhesive used is a two-component adhesive. The two components are reactive with one another and when contacted have adhesive properties and undergo a curing reaction wherein the adhesive is capable of bonding substrates together. One component of the two-component adhesive comprises an isocyanate functional component, which is typically referred to as the resin side or A side. The isocyanate functional component in the two-component adhesive is preferably in the form of an isocyanate functional prepolymer. The other component of the two-component adhesive is an isocyanate reactive component, known as the curative side or B side, which comprises one or more compounds, oligomers or prepolymers having on average more than one group reactive with isocyanate moieties. The isocyanate reactive component may comprise prepolymers or small chain compounds such as difunctional chain extenders or polyfunctional crosslinking agents known in the art. The reaction product of the two components of the two-component adhesive is a cured product which is capable of bonding certain substrates together. Suitable commercially available two-component isocyanate functional adhesives may include BETAFORCE™ 2815S adhesive available from The Dow Chemical Company (BETAFORCE is a trademark of The Dow Chemical Company).

In some embodiments, the isocyanate functional component of the isocyanate functional adhesives comprises aliphatic, cycloaliphatic, araliphatic, heterocyclic or aromatic polyisocyanates, or mixtures thereof. Preferably, the polyisocyanates in the isocyanate functional component have an average isocyanate functionality of 2.0 or more, 2.2 or more, or even 2.4 or more, and at the same time, 4.0 or less, 3.5 or less, or even 3.0 or less. The polyisocyanates in the isocyanate functional component may have an equivalent weight of 80 or more, 100 or more, 110 or more, or even 120 or more, and at the same time, 300 or less, 250 or less, or even 200 or less. Preferred polyisocyanates are aromatic isocyanates, alicyclic isocyanates and derivates thereof. Examples of suitable polyisocyanates in the isocyanate functional component include diphenylmethane diisocyanate and polymeric derivatives thereof, isophorone diisocyanate, tetramethylxylene diisocyanate, 1,6-hexamethylene diisocyanate and polymeric derivatives thereof, bis(4-isocyanatocylohexyl)methane, and trimethyl hexamethylene diisocyanate. The most preferred polyisocyanate is diphenylmethane diisocyanate.

In some embodiments, the isocyanate functional component of the isocyanate functional adhesives comprises one or more isocyanate functional prepolymers. The isocyanate functional prepolymers can be any prepolymers prepared by reaction of an isocyanate functional compound with an isocyanate reactive compound under conditions such that the prepolymer obtained have on average more than one isocyanate moiety (group) per molecule. The isocyanate functional prepolymers may have an average isocyanate functionality of at least 2.0, or even 2.2 or more, at the same time, 4.0 or less, 3.5 or less, or even 3.0 or less. The isocyanate functional prepolymers may have a molecular weight of 500 or more, 1,000 or more, 2,500 or more, or even 3,000 or more, and at the same time, 40,000 or less, 20,000 or less, or even 10,000 or less. The isocyanate content of the isocyanate functional prepolymer may be in the range of 0.1 to 10 wt %, in the range of 1.5 to 5.0 wt %, or in the range of 1.8 to 3.0 wt %, based on the weight of the prepolymer.

For two-component isocyanate functional adhesives, the isocyanate content of the isocyanate functional component may be in the range of 6 to 35 wt %, in the range of 8 to 30 wt %, or in the range of 10 to 25 wt %, based on the weight of the isocyanate functional component.

The isocyanate functional adhesives may further comprise one or more catalysts for the reaction of isocyanate functional groups with isocyanate reactive groups. The catalysts may be located in the isocyanate functional component or in the isocyanate reactive component. For two-component isocyanate functional adhesives, the catalysts are preferably located in the isocyanate reactive component to improve the stability of the two-component adhesives. The catalysts may be organotin compounds, metal alkanoates, tertiary amines or diazabicyclo compounds. Examples of suitable organotin catalysts include alkyl tin oxides such as dibutyl tin oxide, stannous alkanoates such as stannous octoate, dialkyl tin carboxylates and tin mercaptides. Preferred organotin catalyst is a dialkyltin dicarboxylate or a dialkyltindimercaptide. Examples of suitable metal alkanoates include bismuth octoate, bismuth neodecanoate, or mixtures thereof. Examples of suitable tertiary amines include dimorpholinodialkyl ether, a di((dialkylmorpholino) alkyl)ether such as (di-(2-(3,5-dimethyl-morpholino)ethyl) ether); bis-(2-dimethylaminoethyl)ether; triethylene diamine; pentamethyldiethylene triamine; N,N-dimethylcyclohexylamine; N,N-dimethyl piperazine; 4-methoxyethyl morpholine; N-methylmorpholine; N-ethyl morpholine; or mixtures thereof. The catalyst may be present in an amount of from 0.006 to 5.0 wt %, from 0.01 to 2.0 wt %, or from 0.02 to 1.0 wt %, based on the weight of the isocyanate functional component.

In the two-component isocyanate functional adhesives, the isocyanate reactive component may contain one or more compounds having at least two isocyanate reactive groups such as hydroxyl, amine, thiol and carboxyl. Preferably, the isocyanate reactive component comprises a polyol or a polyamine, and more preferably a polyether polyol.

In the two-component isocyanate functional adhesives, the isocyanate reactive component may further comprise one or more low molecular weight compounds having two or more isocyanate reactive groups and a hydrocarbon backbone. The backbone may further comprise one or more heteroatoms. Such low molecular weight compounds may be compounds known in the art as chain extenders, such compounds are difunctional. Such low molecular weight compounds may be compounds also known in the art as crosslinkers, such compounds have, on average, greater than two active hydrogen groups per compound. The heteroatoms in the backbone can be oxygen, sulfur, nitrogen or a mixture thereof. Oxygen, nitrogen or a mixture thereof is more preferred and oxygen is most preferred. The molecular weight of the low molecular weight compound may be 120 or less, or even 100 or less. Preferably, the low molecular weight compound comprises one or more multifunctional alcohols, multifunctional alkanol amines, one or more adducts of a multifunctional alcohol and an alkylene oxide, one or more adducts of a multifunctional alkanol amine and an alkylene oxide, or mixtures thereof. Preferred multifunctional alcohols and multifunctional alkanol amines include ethane diol, propane diol, butane diol, hexane diol, heptanes diol, octane diol, glycerine, trimethylol propane, pentaerythritol, neopentyl glycol, ethanol amines such as diethanol amine and triethanol amine, propanol amines such as di-isopropanol amine and tri-isopropanol amine, or mixtures thereof. When used, the low molecular weight compound may be present in an amount of from 2 to 10 wt %, from 2.5 to 8 wt %, or from 3.0 to 6 wt %, based on the weight of the isocyanate reactive component.

In the two-component isocyanate functional adhesives, the isocyanate reactive component may further comprise polyoxyalkylene polyamine having 2 or greater amines per polyamine. Preferably, the polyoxyalkylene polyamine has 2 to 4 amines per polyamine, and more preferably 2 to 3 amines per polyamine. The polyoxyalkylene polyamine may have a weight average molecular weight of from 200 to 5,000, or from 400 to 3,000. Preferred polyoxyalkylene polyamines are JEFFAMINE™ D-T-403 polypropylene oxide triamine having a molecular weight of about 400 and JEFFAMINE D-400 polypropylene oxide diamine having a molecular weight of about 400, both available from Huntsman Corporation. The polyoxyalkylene polyamines may be present in a sufficient amount to prevent the adhesive from sagging once mixed and applied. When used, the polyoxyalkylene polyamine may be present in an amount of from 0.2 to 6 wt %, from 0.3 to 4 wt %, or from 0.5 to 2 wt %, based on the weight of the isocyanate reactive component.

The isocyanate functional adhesives useful in the present invention may further comprise inorganic fillers. When used, the inorganic fillers may be present in an amount from 10 to 50 wt %, or from 20 to 40 wt %, based on the total weight of the adhesive.

The isocyanate functional adhesives useful in the present invention may further comprise plasticizers. When used, the plasticizers may be present in an amount from 2 to 20 wt %, or from 5 to 10 wt %, based on the total weight of the adhesive.

The isocyanate functional adhesives may further comprise one or more of the following additives: pigments, adhesion promoters, stabilizers such as ultraviolet stabilizers and antioxidants.

For a two-component isocyanate functional adhesive, the two components of the adhesive are preferably combined such that the equivalents of isocyanate groups are greater than the equivalents of isocyanate reactive groups. The equivalents ratio of isocyanate groups to isocyanate reactive groups in the adhesive may be 1.0:1.0 or higher, 1.05:1.0 or higher, or even 1.10:1.0 or greater, and at the same time, 2.0:1.0 or less, or even 1.40:1.0 or less.

In some embodiments, the adhesive system of the present invention when bonded to PBT/PET or polyamide exhibits greater than 75% cohesive failure after exposure of 7 days (23° C. and 50% relative humidity ("RH")), or 7 days (23° C. and 50% RH) and additional 7 days cataplasm exposure, wherein application of the adhesive occurs about 15 minutes or 45 days (23° C. and 50% RH) after application of the composition of the present invention.

The present invention also provides a method of bonding a first substrate to a second substrate. The method comprises (i) applying the activator composition of the present invention to the surface of at least one of the substrates and allowing the solvent to evaporate, (ii) applying the adhesive described above to the surface of at least one of the substrates treated by the composition in step (i), (iii) contacting the two substrates with the adhesive residing therebetween, and (iv) curing the adhesive.

In a preferred application, at least one of the substrates is a plastic substrate described above. The surface of the plastic substrate can be surface treated prior to application of the composition of the present invention. Any known surface treatment means which increase the number of polar groups present on the surface of the plastic may be used, including flame treatment, corona discharge, and chemical etching. Particularly suitable plastics for the substrate(s) include polyamide, PBT, PET, epoxy- or polyester-based fiber reinforced plastic, an epoxy- or polyester-based sheet molding compound, untreated polycarbonate, poly(meth)acrylate polymer and copolymer, styrene-acrylonitrile copolymer, ABS copolymer, or mixtures thereof.

The adhesive used in the method of the present invention can be substantially the same as the adhesive in the adhesive system of the present invention described above. Preferably, the two-component isocyanate functional adhesive is used. The time period between applying the composition of the present invention and applying the adhesive to the surface of the substrate can be any time period when the solvent in the composition volatilizes away, and the composition is still capable of linking up to the adhesive. For example, the time between application of the composition and the adhesive can be 20 seconds or greater, 1 minute or greater, 10 minutes or greater, 15 minutes or greater, 1 days or greater, or even 7 days or greater, and at the same time, 12 months or less, 9 months or less, or even 6 months or less. In some embodiments, the adhesive may be applied in a different location from the location of application of the composition of the present invention.

The two substrates useful in the present invention may be same or different. One of the two substrates may be plastics, metals, alloys, ceramics, glass or composites described above. These substrates may be painted. Generally, the composition and the adhesive are applied at ambient temperature in the presence of atmospheric moisture.

Exposure to atmospheric moisture is sufficient to result in curing of the adhesive. The curing of the adhesive may be further accelerated by applying convection heat, infrared irradiation, induction heating, microwave heating, and/or enhancing the amount of moisture in the atmosphere such as by using a humidity chamber. The adhesive after curing forms a durable bond between the substrates.

EXAMPLES

Some embodiments of the invention will now be described in the following Examples, wherein all parts and percentages are by weight unless otherwise specified. The following materials are used in the examples:

DESMODUR RFE polyisocyanate, available from Bayer Material Science, is a 27% solution of tris(p-isocyanatophenyl)thiophosphate in ethyl acetate with an isocyanate content of 7.2 wt %, based on total product weight.

Resorcinol is available from Sumitomo.

TEGO Surten W111 wetting agent is an alcohol alkoxylate available from Evonik Industries.

UVITEX OB fluorenscing agent is available from CIBA.

Ethyl acetate is available from OMYA AG Switzerland.

BETASEAL 8001 adhesive, available from The Dow Chemical Company, is a one-component polyurethane adhesive that is based on isocyanate end-capped polyol prepolymers and is filled with carbon black and inorganic fillers (predominatly kaoline based fillers).

BETAFORCE 2815S adhesive, available from The Dow Chemical Company, is a two-component polyurethane adhesive comprising A side based on isocyanate end-capped polyol prepolymers; and B side comprising polyols, carbon black and inorganic fillers (predominately kaolin based fillers).

DESMODUR™ L75 aromatic polyisocyanate is a 75% solution of toluene diisocyanate in ethyl acetate and is available from Bayer Material Science.

Isophorone diisocyanate ("IPDI") is available from Perstorp Coatings Inc.

Isopropanol is available from Univar.

Hydrochinon is available from Sigma Aldrich.

The following standard analytical equipment and methods are used in the Examples.

Peel Adhesion Test

Peel adhesion tests are conducted on substrates based on ULTRADUR™ B4040 G6 plastic or STARAMIDE™ A28N polyamide. ULTRADUR B4040 G6 plastic, available from BASF, is a 30 wt % glass fiber reinforced blend of PBT and PET. STARAMIDE A28N polyamide, available from Eurostar European Plastics, is an unreinforced nylon 66.

The substrates are firstly cleaned with BETACLEAN™ 3350 heptane. An activator composition is then applied to the cleaned substrate with a standardized applicator. After a defined flash-off time of 5 minutes, an adhesive bead with a defined geometry, typically 10 millimeters (mm) (height)× 10-15 mm (width)×200 mm (length), is applied. A two-component or one-component adhesive is used for the test. The two-component polyurethane adhesive used is BETA-FORCE 2815S adhesive. The one-component polyurethane adhesive used is BETASEAL 8001 adhesive.

When the two-component polyurethane adhesive is used, the adhesive bead is compressed to a height of approximately 1.5 mm. When the one-component polyurethane adhesive is used, the adhesive bead is compressed to a height of approximately 6 mm. The resultant bonded panel is exposed to defined exposure cycles. Exposure cycles are defined as (1) 7 days at 23° C. and 50% RH, and (2) 7 days of cataplasm. Cataplasm treatment includes: packaging of the bonded panel with cotton, saturating the cotton packaging with 10 fold water, and consecutively wrapping in aluminum foil and polyethylene (PE) foil to avoid evaporation. The packed sample is exposed for 7 days at 70° C., followed by 16 hours at −20° C., and brought to ambient temperature. Then the sample is unwrapped and stored at 23° C. for 2 hours.

For some samples, the exposure cycle (2) is performed according to an OEM specification SW308, in which the bonded panel is exposed 20 times according to the following temperature and humidity cycle: (a) 5 hours at 90° C. and 80% RH, (b) 1 hour at 23° C. and 20% RH, and (c) 4 hours at −30° C. One hour each is allowed in order to establish the described climatic conditions (b) and (c), defining the duration of 1 cycle to be 12 hours.

To evaluate the adhesion performance, the adhesive bead is cut on the edge approximately 10 mm parallel to the substrate and peeled off in a 90° angle. At approximately each 10 mm, the peeled off bead is cut with a knife to the substrate and peeling is continued. Most commonly used extensions are AF=adhesive exhibits delaminating from the substrate, and CF=cohesive failure within the hardened bulk of the adhesive. The peeled samples are evaluated according to the percent of CF. The bigger the percent of cohesive failure, the better the adhesion performance.

Storage Stability

The storage stability of an activator composition is evaluated according to the isocyanate content change and the adhesion performance change over time. The isocyanate content is determined according to the ASTM D 5155-01 method. An activator composition is stored at 40° C. for 6 weeks, or 4 months, respectively. The isocyanate content of the activator composition before and after storage is measured. A decrease of the isocyanate content of less than 10% after 6-week or 4-month storage at 40° C. is considered acceptable. Sample storage at 40° C. is performed in ventilated ovens. The storage stability of an activator composition is further evaluated according to the change of adhesion performance over time. Peel adhesion performance of the aged activator composition needs to provide a failure mode of at least 75% CF.

Examples (Exs) 1-6

Activator compositions of Exs 1-6 were prepared based on formulations shown in Table 1. Resorcinol was dissolved at room temperature (21 to 25° C.) in ethyl acetate. DESMODUR RFE polyisocyanate was added slowly while stirring to form a homogenous solution. UVITEX OB fluorescing agent and if present, a wetting agent were added into the homogenous solution to give an activator composition.

TABLE 1

|  | Ex 1 | Ex 2 | Ex 3 | Ex 4 | Ex 5 | Ex 6 |
| --- | --- | --- | --- | --- | --- | --- |
| Activator Composition (wt % based on the total weight of the activator composition) | | | | | | |
| Resorcinol | 6.10 | 7.6 | 10.77 | 12.25 | 8.32 | 9.43 |
| DESMODUR RFE | 36.79 | 46.3 | 64.99 | 73.92 | 43.95 | 39.86 |
| UVITEX OB | 0.04 | 0.04 | 0.04 | 0.04 | 0.04 | 0.04 |
| Ethyl acetate | 57.07 | 45.96 | 24.20 | 13.79 | 47.69 | 50.67 |
| TEGO Surten W111 | 0.0 | 0.1 | 0.0 | 0.0 | 0.0 | 0.0 |
| Total | 100.0 | 100.0 | 100.0 | 100.0 | 100.0 | 100.0 |
| Properties of Activator Composition | | | | | | |
| Solids content, wt % | 16.0 | 20.2 | 28.3 | 32.2 | 20.2 | 20.2 |
| NCO content, wt % | 2.66 | 3.35 | 4.70 | 5.34 | 3.18 | 2.88 |
| OH/NCO molar ratio | 1.75/1 | 1.75/1 | 1.75/1 | 1.75/1 | 2/1 | 2.5/1 |

Comparative (Comp) Exs A-H

Activator compositions of Comp Exs A-H were prepared according to the same procedure as described in Exs 1-6, based on formulations shown in Table 2.

TABLE 2

|  | Comp Ex A | Comp Ex B | Comp Ex C | Comp Ex D | Comp Ex E | Comp Ex F | Comp Ex G | Comp Ex H |
| --- | --- | --- | --- | --- | --- | --- | --- | --- |
| Activator Composition (wt % based on the total weight of the activator composition) | | | | | | | | |
| Resorcinol | 0.0 | 7.50 | 2.28 | 3.58 | 5.27 | 0.0 | 12.3 | 8.49 |
| Hydrochinon | 0.0 | 0.0 | 0.0 | 0.0 | 0.0 | 6.10 | 0.0 | 0.0 |
| DESMODUR RFE | 35.00 | 0.0 | 60.29 | 37.78 | 37.12 | 36.79 | 0.0 | 0.0 |
| IPDI | 0.0 | 0.0 | 0.0 | 0.0 | 0.0 | 0.0 | 14.1 | 0.0 |
| DESMODUR L75 | 0.0 | 0.0 | 0.0 | 0.0 | 0.0 | 0.0 | 0.0 | 27.86 |
| UVITEX OB | 0.0 | 0.0 | 0.04 | 0.04 | 0.04 | 0.04 | 0.04 | 0.04 |

TABLE 2-continued

|  | Comp Ex A | Comp Ex B | Comp Ex C | Comp Ex D | Comp Ex E | Comp Ex F | Comp Ex G | Comp Ex H |
|---|---|---|---|---|---|---|---|---|
| Isopropanol | 0.0 | 92.5 | 0.0 | 0.0 | 0.0 | 0.0 | 0.0 | 0.0 |
| Ethyl acetate | 65.00 | 0.0 | 37.39 | 58.6 | 57.57 | 57.07 | 73.56 | 63.61 |
| Total | 100.0 | 100.0 | 100.0 | 100.0 | 100.0 | 100.0 | 100 | 100.0 |
| Properties of Activator Composition | | | | | | | | |
| Solids content, wt % | 9.5 | 7.5 | 16.0 | 16.0 | 16.0 | 16.0 | 26.3 | 16.0 |
| NCO content, wt % | 2.50 | 0.0 | 4.36 | 2.73 | 2.68 | 2.66 | 2.66 | 3.70 |
| OH/NCO molar ratio | 0 | n.a. | 0.4/1 | 1/1 | 1.5/1 | 1.75/1 | 1.75/1 | 1.75/1 |

Storage stabilities of activator compositions were evaluated according to the test method described above and were reported in Table 3. After storage at 40° C. for 6 weeks, the isocyanate content change for the activator compositions of Exs 1-2, and 5-6 was about 1%, 5%, 2%, and 2%, respectively. Even after storage at 40° C. for 4 months, the isocyanate content change for the activator composition of Ex 1 was only about 8%. In addition, the activator compositions of Exs 2-5 after aging at 40° C. for 4 months were evaluated for adhesion performance in combination with the two-component adhesive on ULTRADUR PBT/PET substrate. The resultant bonded panels were then cured for 7 days at 23° C. and 50% RH, and additional 7 days of cataplasm treatment. The bonded panels all showed 100% CF failure mode. It indicates the activator compositions of the present invention have good stability.

molar ratio of from 1.75 to 2.5 (Exs 1-6) provided robust adhesion performance after curing for 7 days at 23° C. and 50% RH as well as after cataplasm exposure. In contrast, the activator compositions containing no resorcinol (Comp Ex A) or containing no isocyanate (Comp Ex B) provided unacceptable adhesion performance (0% CF). The activator compositions with an OH/NCO molar ratio of 1.5 or lower (Comp Exs C-E) did not provide satisfactory adhesion performance. The activator compositions based on hydrochinon (Comp Ex F), IPDI (Comp Ex G) or toluene diisocyanate (Comp Ex H) provided unacceptable adhesion performance after exposure of 7 days at 23° C. and 50% RH.

Table 4 also showed the peel adhesion test results of activator compositions in combination with the one-component polyurethane adhesive on a polyamide substrate after 15 minutes at 23° C. and 50% RH (open time). The activator

TABLE 3

|  | Ex 1 | Ex 2 | Ex 3 | Ex 4 | Ex 5 | Ex 6 |
|---|---|---|---|---|---|---|
| NCO content fresh, wt % | 2.66 | 3.35 | 4.70 | 5.34 | 3.18 | 2.88 |
| NCO content after 6 weeks at 40° C., wt % | 2.63 | 3.15 | n.a. | n.a. | 3.11 | 2.82 |
| NCO content after 4 months at 40° C., wt % | 2.45 | n.a. | n.a. | n.a. | n.a. | n.a. |
| Failure Mode (activator composition aged at 40° C. for 4 months; open time: 15 minutes at 23° C. and 50% RH) | | | | | | |
| ULTRADUR PBT/PET substrate/BETAFORCE 2815S, 7-day curing at 23° C. and 50% RH adhesion, | n.a. | 100% CF | 100% CF | 100% CF | 100% CF | n.a. |
| ULTRADUR PBT/PET substrate/ BETAFORCE 2815S, 7-day cataplasm exposure | n.a. | 100% CF | 100% CF | 100% CF | 100% CF | n.a. |

These activator compositions were evaluated for adhesion performance in combination with the one-component or two-component polyurethane adhesive on different substrates after different open times, according to the peel adhesion test described above. The adhesion properties of the resultant bonded panels were reported in Tables 4 to 6.

Table 4 showed the peel adhesion test results of activator compositions in combination with the two-component polyurethane adhesive on ULTRADUR PBT/PET substrate, or with the one-component polyurethane adhesive on the polyamide substrate (Open time: 15 minutes at 23° C. and 50% RH).

As shown in Table 4, the two-component polyurethane adhesive was applied 15 minutes after the application of an activator composition onto ULTRADUR PBT/PET substrate. The bonded panels were then exposed for 7 days at 23° C. and 50% RH, and successively 7 days of cataplasm treatment. The activator compositions with an OH/NCO compositions of Exs 1-2 and 5 provided much better adhesion performance (100% CF) than the activator compositions of Comp Exs A-B (0% CF).

TABLE 4

| Open Time: 15 | Failure Mode | | |
|---|---|---|---|
| minutes at 23° C., 50% RH | ULTRADUR PBT/PET Substrate; BETAFORCE 2815S Adhesive | | Polyamide Substrate; BETASEAL 8001 Adhesive |
| Curing Conditions | 7 days at 23° C. and 50% RH | 7 days cataplasm | 7 days at 23° C. and 50% RH |
| Comp Ex A | 0% CF | 0% CF | 0% CF |
| Comp Ex B | 0% CF | 0% CF | 0% CF |
| Comp Ex C | 25% CF | 100% CF | n.a. |
| Comp Ex D | 0% CF | 87% CF | n.a. |
| Comp Ex E | 0% CF | 87% CF | n.a. |

TABLE 4-continued

| Open Time: 15 minutes at 23° C., 50% RH | Failure Mode | | |
|---|---|---|---|
| | ULTRADUR PBT/PET Substrate; BETAFORCE 2815S Adhesive | | Polyamide Substrate; BETASEAL 8001 Adhesive |
| Curing Conditions | 7 days at 23° C. and 50% RH | 7 days cataplasm | 7 days at 23° C. and 50% RH |
| Comp Ex F | 0% CF | n.a. | n.a. |
| Comp Ex G | 0% CF | n.a. | n.a. |
| Comp Ex H | 0% CF | n.a. | n.a. |
| Ex 1 | 100% CF | 100% CF | 100% CF |
| Ex 2 | 100% CF | 100% CF | 100% CF |
| Ex 3 | 100% CF | 100% CF | n.a. |
| Ex 4 | 100% CF | 100% CF | n.a. |
| Ex 5 | 90% CF, 10% AF | 100% CF | 100% CF |
| Ex 6 | 90% CF, 10% AF | 100% CF | n.a. |

Table 5 showed the peel adhesion test results of activator compositions in combination with the two-component polyurethane adhesive on ULTRADUR PBT/PET substrate. After the application of the activator composition, the substrate was exposed for 45 days at 23° C. and 50% RH (open time). The two-component polyurethane adhesive was then applied to the substrate and exposed for 7 days at 23° C. and 50% RH, and successively 7 days according to the cataplasm exposure described above. The activator compositions of Exs 1-6 provided satisfactory adhesion performance (100% CF) after all exposures. In contrast, the activator compositions of Comp Exs A-B both provided unacceptable adhesion performance (0% CF).

TABLE 5

| | Failure Mode (Open time: 45 days, 23° C. and 50% RH; ULTRADUR PBT/PET substrate; BETAFORCE 2815S adhesive) | | | | | | | |
|---|---|---|---|---|---|---|---|---|
| Curing Conditions | Comp Ex A | Comp Ex B | Ex 1 | Ex 2 | Ex 3 | Ex 4 | Ex 5 | Ex 6 |
| 7 days at 23° C. and 50% RH | 0% CF | 0% CF | 100% CF | 100% CF | 100% CF | 100% CF | 100% CF | 100% CF |
| 7 days cataplasm | 0% CF | 0% CF | 100% CF | 100% CF | 100% CF | 100% CF | 100% CF | 100% CF |

Table 6 showed the peel adhesion test results of activator compositions in combination with the two-component polyurethane adhesive. After the application of the activator composition to ULTRADUR PBT/PET substrate, the substrate was exposed for 7 days at 32° C. and 80% RH (open time). The two-component polyurethane adhesive was then applied to the substrate and exposed for 7 days at 23° C. and 50% RH, and successively 10 days under SW308 exposure described above. The activator compositions of Exs 1-6 provided much better adhesion performance after all exposures than the activator compositions of Comp Exs A-B.

In addition, the activator composition of Comp Ex E showed poor substrate wetting on PBT/PET based blends, which resulted in insufficient functionalization of the surface of the substrate. Substrate wetting on PBT/PET based blends can be further improved by the use of a suitable wetting agent in an activator composition (Ex 2). In addition, activator compositions of Exs 1-6 that were applied on ULTRADUR PBT/PET substrate also showed fluorescence upon irradiation with a standard hand held UV lamp (265 nanometers, 220 Voltages, 50 Hertz).

TABLE 6

| | Failure Mode (Open time: 7 days, 32° C. and 80% RH; ULTRADUR PBT/PET substrate; BETAFORCE 2815S adhesive) | | | | | | | |
|---|---|---|---|---|---|---|---|---|
| Curing Conditions | Comp Ex A | Comp Ex B | Ex 1* | Ex 2 | Ex 3 | Ex 4 | Ex 5 | Ex 6 |
| 7 days at 23° C., 50% RH | 0% CF | 0% CF | 100% CF | 100% CF | 100% CF | 100% CF | 100% CF | 100% CF |
| 10 days SW308 | 0% CF | 0% CF | 100% CF | 100% CF | 100% CF | 100% CF | 100% CF | 100% CF |

*Open time conditions: 23° C. and 50% RH

The invention claimed is:

1. A composition comprising:
   (a) resorcinol, an alkoxylated resole or a condensation product of 1,3-dihydroxylbenzene with formaldehyde
   (b) an aromatic polyisocyanate compound comprising tris (p-isocyanatophenyl)thiophosphate, silane functionalized tris (p-isocyanatophenyl)thiophosphate, or a mixture thereof and
   (c) a solvent,
   wherein the molar ratio of total hydroxyl groups to total isocyanate groups of the composition is from 1.6:1 to 3.0:1, and the composition has a solids content from 7 to 50 wt % based on the total weight of the composition; and wherein isocyanate content of the composition changes less than 10% after 6-week storage at 40° C.

2. The composition of claim 1, wherein the molar ratio of total hydroxyl groups to total isocyanate groups is from 1.75:1 to 2.5:1.

3. The composition of claim 1, wherein the solids content of the composition is from 16 to 36 wt % based on the total weight of the composition.

4. The composition of claim 1, wherein isocyanate content of the composition changes less than 10% after 4-month storage at 40° C.

5. An adhesive system comprising the composition of claim 1, and an adhesive.

6. The adhesive system of claim 5, wherein the adhesive is a one-component or two-component isocyanate functional adhesive, or an adhesive having a functional group selected from acrylic, methacrylic, siloxy, epoxy or a mixture thereof.

7. A method of bonding a first substrate to a second substrate, comprising:
   (i) lying the composition of claim 1 to the surface of at least one of the substrates and allowing the solvent to evaporate, (ii) applying an adhesive to the surface of at least one of the substrates treated by the composition in step (i),
(iii) contacting the two substrates with the adhesive residing therebetween, and
(iv) curing the adhesive.

8. The method of claim 7, wherein the time between the application of the composition and the application of the adhesive is from 1 minute to 3 months.

9. The method of claim 7, wherein the adhesive is a one-component or two-component isocyanate functional adhesive.

10. The method of claim 7, wherein at least one of the substrates is selected from polyamide, polybutylene terephthalate, polyethylene terephthalate, epoxy- or polyester-based fiber reinforced plastic, an epoxy- or polyester-based sheet molding compound, untreated polycarbonate, poly(meth)acrylate polymer and copolymer, styrene-acrylonitrile copolymer, acrylonitrile-butadiene-styrene copolymer, or mixtures thereof.

11. A composition comprising:
(a) resorcinol, an alkoxylated resole or a condensation product of 1,3-dihydroxybenzene with formaldehyde
(b) an aromatic polyisocyanate compound having at least 3 isocyanate groups and
(c) a solvent,
wherein the molar ratio of total hydroxyl groups to total isocyanate groups of the composition is from 1.6:1 to 3.0:1, and the composition has a solids content from 7 to 50 wt % based on the total weight of the composition; and wherein isocyanate content of the composition changes less than 10% after 6-week storage at 40° C., and further wherein the composition comprises, based on the total weight of the composition, (a) from 6 to 13 wt % of the resorcinol, an alkoxylated resole or a condensation product of 1,3-dihydroxybenzene with formaldehyde, (b) from 4.6 to 20.3 wt % of the polyisocyanate compound, (c) from 65 to 85 wt % of the solvent, (d) from 0.05 to 0.3 wt % of a fluorescing agent, and (e) from 0 to 1 wt % of a surfactant.

12. An adhesive system comprising the composition of claim 11, and an adhesive.

13. A method of bonding a first substrate to a second substrate, comprising:
(i) lying the composition of claim 11 to the surface of at least one of the substrates and allowing the solvent to evaporate,
(ii) applying an adhesive to the surface of at least one of the substrates treated by the composition in step (i),
(iii) contacting the two substrates with the adhesive residing therebetween, and
(iv) curing the adhesive.

14. A composition comprising:
(a) resorcinol, an alkoxylated resole or a condensation product of 1,3-dihydroxybenzene with formaldehyde
(b) an aromatic polyisocyanate compound having at least 3 isocyanate groups and
(c) a solvent,
wherein the molar ratio of total hydroxyl groups to total isocyanate groups of the composition is from 1.6:1 to 3.0:1, and the composition has a solids content from 7 to 50 wt % based on the total weight of the composition; and wherein isocyanate content of the composition changes less than 10% after 6-week storage at 40° C., the composition further comprising hydroquinone, catechol, or a mixture thereof.

15. An adhesive system comprising the composition of claim 14, and an adhesive.

16. A method of bonding a first substrate to a second substrate, comprising:
(i) applying the composition of claim 14 to the surface of at least one of the substrates and allowing the solvent to evaporate,
(ii) applying an adhesive to the surface of at least one of the substrates treated by the composition in step (i),
(iii) contacting the two substrates with the adhesive residing therebetween, and
(iv) curing the adhesive.

* * * * *